July 29, 1930.  J. C. McCUNE  1,771,413
COMPRESSOR UNLOADER
Filed July 2, 1928
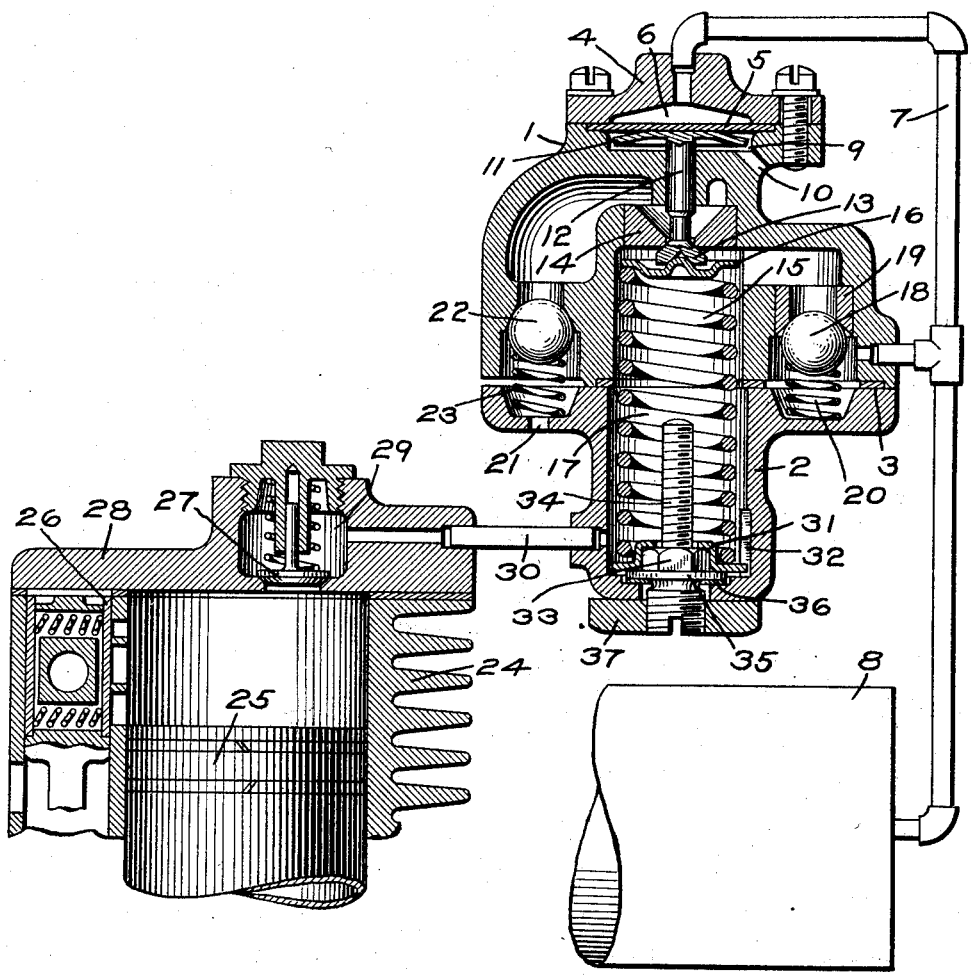
INVENTOR
JOSEPH C. McCUNE
BY *Wm. M. Cody*
ATTORNEY Patented July 29, 1930

1,771,413

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COMPRESSOR UNLOADER

Application filed July 2, 1928. Serial No. 289,660.

This invention relates to fluid compressors, and more particularly to an unloading device therefor.

It has heretofore been proposed to provide an unloading device for fluid compressors in which the fluid compressing cylinder of the compressors is automatically opened to the atmosphere in order to unload the compressor.

It has been found that when a compressor is running unloaded, with the compressing cylinder open to the atmosphere, there is an excessive passage of oil past the compressor piston, which is highly undesirable.

The principal object of my invention is to provide a compressor unloading device in which the above difficulty is overcome.

In the accompanying drawing, the single figure is a diagrammatic sectional view of a fluid compressor and an unloading device embodying my invention.

I have found that if a fluid compressor runs under a light load, excessive oil throwing will not occur and accordingly I have provided an unloading device in which the compressor is maintained under a light load when running unloaded.

As shown in the drawing, the unloading device may comprise casing sections 1 and 2 which are secured together, a gasket 3 being interposed between the sections to prevent leakage. Clamped between an upper face of the section 1 and a cap plate 4 is a flexible diaphragm 5, having chamber 6 at one side connected by a pipe 7 with the usual main or storage reservoir 8. The chamber 9 at the opposite side is open to the atmosphere through a port 10.

A follower plate 11 engages the diaphragm 5 and is provided with a stem 12 having carrying valve 13 at its outer end and extending through an opening in a partition wall of the casing section 1. The valve 13 engages a seat in a bushing 14 and said valve is urged to its seat by the pressure of an adjustable spring 15, a spring follower 16 being interposed between the valve and the spring.

The chamber 17 containing the spring 15 is connected to pipe 7 and the main reservoir 8 through a passage containing a ball check valve 18 which engages a seat provided on a bushing 19 and which is subject to the pressure of a spring 20, such being sufficient to hold the valve to its seat, when no fluid pressure is acting on the valve.

The valve 13 controls communication from the chamber 17 to a passage open to the atmosphere through a port 21 and containing a ball check valve 22 which is subject to the pressure of a spring 23, urging the valve to its seat.

A portion of a fluid compressor is shown comprising the usual piston cylinder 24 containing a fluid compressing piston 25 and having a fluid inlet valve 26 and a discharge valve 27, which is mounted in the casing head 28.

The chamber 29 containing the discharge valve 27 is connected by a pipe 30 with the spring chamber 17 of the unloading device.

For adjusting the tension of the spring 15, a spring follower 31 is provided, having a portion adapted to engage in a groove 32 in the casing section, so as to prevent rotation of the follower. A nut 33, having screw-threaded engagement on a threaded rod 34, is mounted in a recess in the follower and is prevented from rotating by the follower. The rod 34 is provided with a circular flange 35 which bears against a gasket 36 and the outer end of the rod is threaded to receive a locking nut 37.

The tension of the spring 15 may be increased by loosening the nut 37, so as to permit rotation of the rod 34 by a screw driver or the like. When the rod 34 is rotated, the nut is held from rotation by the follower 31, so that the nut travels upwardly on the rod, carrying with it the follower 31, so that the spring is correspondingly compressed. Downward lognitudinal movement of the rod 34 is prevented by the flange 35 pressing against the gasket 36, which is held in place by the lower end wall of the casing section 2.

When the desired adjustment of the spring tension is effected, the nut 37 is turned so as to lock the parts in the adjusted position. The gasket 36 serves to prevent leakage from the spring chamber 17.

In operation, the spring 15 having been adjusted to correspond with the maximum pressure it is desired to maintain in the main reservoir 8 and the fluid compressor being in operation, fluid is compressed by the piston 25 and is discharged into the spring chamber 17 of the unloading device and thence flows past the check valve 18 to pipe 7 and the main reservoir 8.

With the pressure in the main reservoir below a predetermined degree, the spring 15 acts to hold the valve 13 seated, but when the pressure in the main reservoir has been increased to a predetermined degree by operation of the compressor, the main reservoir pressure acting on chamber 6 on the diaphragm 5 operates the diaphragm against the pressure of spring 15, so as to unseat the valve 13.

Fluid from the compressor can then flow from the spring chamber 17 past the check valve 22 to the atmosphere by way of port 21. The check valve 22, however, being acted upon by spring 23, causes a pressure to be maintained in the spring chamber 17 in proportion to the pressure of the spring, so that a light load is maintained on the compressor while the compressor is running unloaded and the maintenance of this light load prevents the compressor from throwing an excessive amount of oil.

When the valve 13 is seated, the pressure of fluid in the spring chamber 17 opposes atmospheric pressure in the space above the valve, but when the valve lifts from its seat, the pressure of fluid in the space above the valve increases by flow past the valve, while the pressure in chamber 17 reduces, so that according to the area of the valve, an increase in the force tending to unseat the valve is effected as soon as the valve moves slightly from its seat, so that a quick, positive opening movement of the valve is obtained.

In the closing movement of the valve, as the valve approaches its seat, the pressure of fluid above the valve tends to reduce, while the pressure of fluid below the valve in chamber 17 tends to increase, so that the positive closing movement of the valve is facilitated.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a fluid compressor, of an unloading device operated upon a predetermined increase in the pressure of fluid compressed by the compressor for opening a vent for the fluid discharged from the compressor, and means for permitting a predetermined build-up of pressure of fluid discharged when said vent is open.

2. The combination with a fluid compressor, of an unloading device operated upon a predetermined increase in the pressure of fluid compressed by the compressor for opening a vent for the fluid discharged from the compressor, and means for preventing the venting of fluid discharged from the compressor below a predetermined pressure.

3. The combination with a fluid compressor, of an unloading device operated upon a predetermined increase in the pressure of fluid compressed by the compressor for opening a vent for the fluid discharged from the compressor, and a spring-loaded check valve for preventing the venting of fluid discharged from the compressor below a predetermined pressure.

4. The combination with a fluid compressor, of an unloading device having a chamber into which fluid compressed by the compressor is discharged and comprising a valve for controlling the venting of fluid from said chamber to the atmosphere, a movable abutment operated upon a predetermined increase in the pressure of fluid compressed by the compressor for opening said valve, and means for preventing a reduction in the pressure of fluid in said chamber below a predetermined degree by venting to the atmosphere.

5. An unloading device for a fluid compressor comprising a valve for controlling the venting of fluid discharged from the compressor, a movable abutment subject to the pressure of fluid compressed by the compressor for operating said valve, a spring for opposing fluid pressure on said abutment, a follower plate engaging said spring, a threaded rod, a nut having threaded engagement on said rod and operated upon rotation of said rod to shift said follower plate so as to vary the tension of said spring.

In testimony whereof I have hereunto set my hand, this 29th day of June, 1928.

JOSEPH C. McCUNE.